Feb. 25, 1958   J. W. GLASS   2,824,343
GERMICIDAL DEVICE
Filed Sept. 28, 1955

INVENTOR.
JAMES W. GLASS
BY W. B. Harpman
ATTORNEY

United States Patent Office 2,824,343
Patented Feb. 25, 1958

2,824,343
GERMICIDAL DEVICE

James W. Glass, New Castle, Pa.

Application September 28, 1955, Serial No. 537,219

4 Claims. (Cl. 21—74)

This invention relates to an air filter and more particularly to a device for removing air borne bacteria from air passed therethough.

The principal object of the invention is the provision of a germicidal air treating device.

A further object of the invention is the provision of a device which may be employed with any forced air system for effectively destroying air borne bacteria in air passed therethrough.

A still further object of the invention is the provision of means for causing a moving air column to follow a greatly lengthened tortuous path while simultaneously subjecting air in said tortuous path to ultraviolet radiation, some of which is directed directly against the air column and some of which is passed through the portions of the device forming the tortuous path to indirectly contact the air flowing therethrough.

A still further object of the invention is the provision of a device including baffles through which ultra-violet radiation freely passes for establishing a tortuous path through which a given quantity of air will take an appreciable time to pass and thereby enable ultraviolet radiation to destroy air borne bacteria therein.

The germicidal device disclosed herein comprises a relatively simple yet efficient device for subjecting circulating air to ultraviolet radiation for the purpose of eliminating air borne bacteria therefrom.

It has previously been determined that air borne bacteria exposed to ultraviolet radiations are largely destroyed provided the time of exposure is sufficiently great to enable such destructtion. On the other hand, it has also been determined that an air current passing a source of ultraviolet radiation rapidly is not rendered free of air borne bacteria by said radiation due to the insufficiency of time of impingement of said ultraviolet radiation with the air current or, more specifically, the air borne bacteria in the air current.

The present device relates to a device which will permit a relatively large and rapid flow of air therethrough while at the same time slowing down the air flow through the use of suitable baffles and causing the air flow to alternate back and forth as it progresses through the device whereby it is maintained within the effective range of ultraviolet energy radiation in the device for an effective time to destroy air borne bacteria therein.

With the foregoing and other objects in view which will appear as the description proceeds, the invention resides in the combination and arrangement of parts and in the detail of construction hereinafter described and claimed, it being the intention to cover all changes and modifications of the example of the invention herein chosen for purposes of the disclosure, which do not constitute departures from the function and scope of the invention.

The invention is illustrated in the accompanying drawing, wherein.

Figure 1:
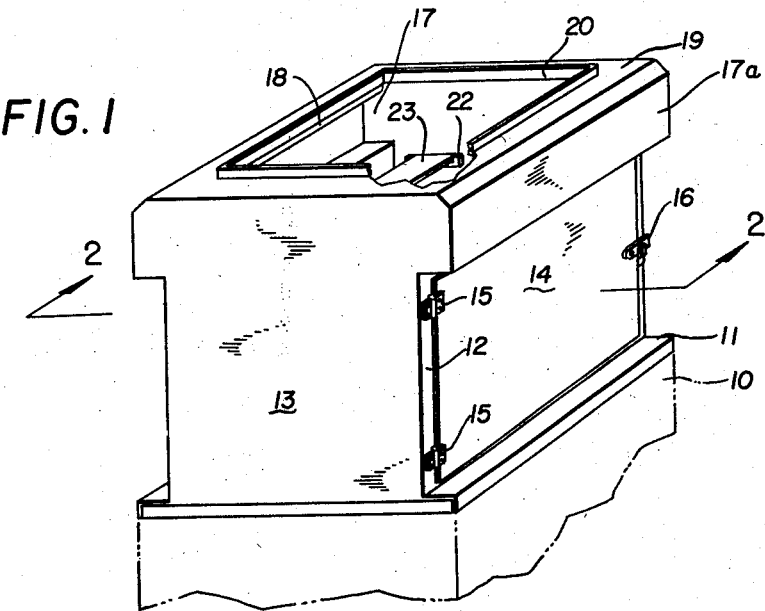
Figure 1 is a perspective view of the germicidal device with parts broken away and parts in cross section and dotted lines indicating an air conditioning device for supporting the germicidal device.

By referring to the drawings and Figure 1 in particular it will be seen that dotted lines indicate the upper portion of the air conditioning device such as a warm air furnace 10 upon the upper surface of which is positioned a base 11 which in turn supports an enclosure having inlet and outlet openings and comprising side walls 12—12 and end walls 13—13. One of the side walls 12 is provided with an access opening 14 which is hinged thereto as by hinges 15—15 and provided with a keeper 16. Alternately, the access opening 14 may be located in one of the end walls 13 if desired.

The uppermost portion of the side walls 12 extend outwardly as at 17A—17A to accommodate within the same enlarged areas 17—17 in which are positioned sources of ultraviolet radiation 18—18 such as are known in the art and are commercially available in tubular form. The sources of ultraviolet radiation 18 are energized by suitable electric circuits, not shown.

A top 19 with a relatively large inlet opening 20 therein completes the enclosure and it will be observed that air can be introduced into the top of the device through the inlet opening 20 and that it will flow outwardly at the bottom of the device through an outlet opening 21 in the base 11.

When the device is positioned on an air conditioning unit such as a warm furnace or the like, as indicated by the dotted lines and the numeral 10, the blower in the air conditioning unit will pull the air through the germicidal device. Those skilled in the art will observe that it can be positioned in the cold air return duct (not shown) so that all of the air in an air heating or conditioning system will pass therethrough.

Figure 2:
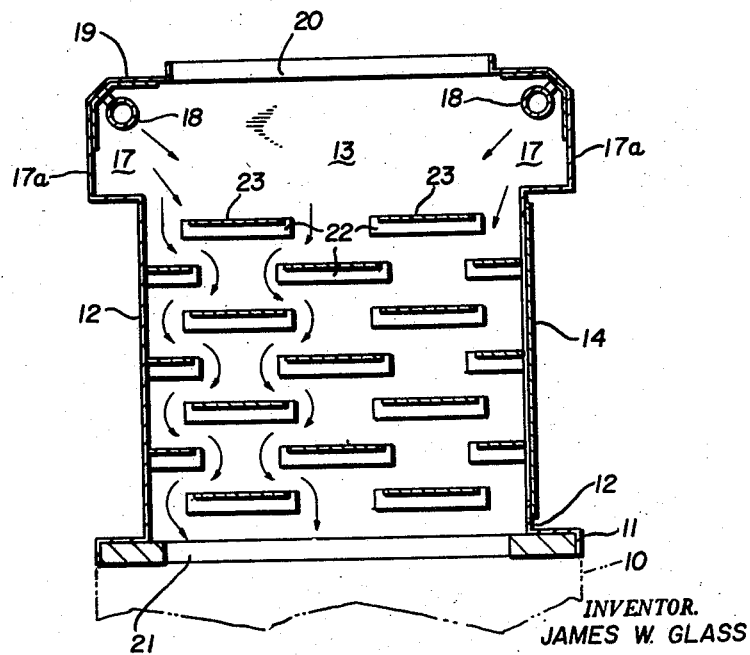
Figure 2 is a vertical section taken on line 2—2 of Figure 1, dotted lines indicating an air conditioning device supporting the germicidal device.

The opposite end walls 13 are provided with a plurality of horizontally disposed brackets 22 which are arranged in horizontally and vertically spaced relation and staggered with respect to one another so that air currents passing vertically through the device (as shown in Figs. 1 and 2 in particular) will be forced to follow a tortuous path when a plurality of baffles 23—23 are positioned on the oppositely disposed pairs of brackets 22—22 and extend across the device in staggered relation to one another. The baffles 23 are formed of transparent material such as quartz capable of transmitting ultraviolet radiations in the wave bands determined suitable for germicidal effect.

It will be apparent that air currents entering the device from the top and flowing therethrough will follow tortuous paths around and about the plurality of baffles 23, each of which is light transmitting, so that the air currents flow back and forth from side to side in passing through the device and are thereby subjected to the ultraviolet radiations from the ultraviolet sources 18 for a length of time suitable to effect control of the air borne bacteria therein.

It will occur to those skilled in the art that the device while herein illustrated as having the light transmitting baffles 23 arranged in horizontally disposed positions, is equally effective when the same are arranged in vertically disposed position and the air passed therethrough from side to side as, for example, when the structure disclosed in Figures 1 and 2 of the drawings is turned on its side.

The access opening 14 provides means for positioning, replacing and cleaning the light transmitting baffles 23 and which cleaning operation is necessarily required more frequently when the light transmitting baffles 23 are horizontally disposed than when the same are vertically disposed. The access opening 14 also provides access to the ultraviolet source lamps so that the same can be cleaned and/or replaced when necessary.

Tests incorporating various bacteria introduced into the device of the invention and including agar cultures positioned immediately beneath the ultraviolet sources 18 and beneath the furthermost light transmitting baffles 23 revealed practically complete germicidal effect on air passed through the device in normal speed and volume with respect to a forced warm air conditioning system.

It will thus be seen that the several objects of the invention are met by the germicidal device disclosed herein.

Having thus described my invention, what I claim is:

1. A germicidal device through which air may be directed and comprising an enclosure having oppositely disposed inlet and outlet openings, ultraviolet sources in said enclosure adjacent said inlet opening and a plurality of ultraviolet light transmitting baffles positioned across said enclosure at right angles to a line passing axially through said inlet and outlet openings, each of said light transmitting baffles being of a width less than the width of said housing and wherein each of said light transmitting baffles is arranged in staggered spaced relation with respect to one another.

2. The germicidal device set forth in claim 1 wherein the enclosure has an access opening therein, a closure closing said access opening, and wherein the ultraviolet light transmitting baffles are removably positioned in said housing.

3. The germicidal air filter set forth in claim 1 wherein the ultraviolet light transmitting baffles are positioned horizontally and vertically spaced with respect to one another and partially overlie and underlie one another.

4. A germicidal device through which air may be directed and comprising an enclosure having inlet and outlet openings, ultraviolet light sources in said enclosure and a plurality of ultraviolet transparent baffles positioned across said enclosure between said inlet and outlet openings, each of said ultraviolet transparent baffles being of a width less than the width of said housing, and wherein each of said ultraviolet transparent baffles is positioned in staggered spaced relation with respect to another of said baffles so as to form a tortuous path in said housing between said inlet and outlet openings.

References Cited in the file of this patent
UNITED STATES PATENTS
1,249,982     Markel _____ Dec. 11, 1917